(12) United States Patent
Fredlund

(10) Patent No.: US 6,354,215 B2
(45) Date of Patent: Mar. 12, 2002

(54) METHOD AND APPARATUS FOR PRINTING DIGITAL IMAGES

(75) Inventor: John R. Fredlund, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/837,040

(22) Filed: Apr. 18, 2001

Related U.S. Application Data

(62) Division of application No. 09/248,967, filed on Feb. 12, 1999.

(51) Int. Cl.[7] .............................. B41J 5/30; B41L 47/56
(52) U.S. Cl. ........................ 101/484; 400/61; 400/70; 400/76
(58) Field of Search ..................... 101/484; 400/76, 400/70, 61

(56) References Cited

U.S. PATENT DOCUMENTS

| | | | |
|---|---|---|---|
| 5,365,290 A | * 11/1994 | Suzuki et al. | 354/64 |
| 5,708,860 A | * 1/1998 | Nonaka et al. | 396/28 |
| 5,841,885 A | * 11/1998 | Neff et al. | 382/112 |

FOREIGN PATENT DOCUMENTS

| | | | |
|---|---|---|---|
| JP | 408076287 A | * | 3/1996 |
| JP | 408328116 A | * | 12/1996 |

OTHER PUBLICATIONS

Patent Abstracts of Japan vol. 14, No. 320 (E–950), Jul. 10, 1990 JP 02 105794 A (Sumotomo Electric Ind. Ltd.), Apr. 18, 1990.

* cited by examiner

Primary Examiner—John S. Hilten
Assistant Examiner—Charles H. Nolan, Jr.
(74) Attorney, Agent, or Firm—Frank Pincelli

(57) ABSTRACT

A method apparatus for printing a customer image order containing at least one image captured underwater. A digital record of a customer image order containing at least one image captured underwater is obtained. The image captured underwater is determined and the digital record of the underwater captured image is modified in a predetermined manner. The determination of the existence of an image captured underwater may be provided by analyzing the image record or obtained by reading information received from the customer image order. Thereafter modified image may be printed and/or displayed.

6 Claims, 5 Drawing Sheets

BRIGHTNESS LEVEL
RED CHANNEL (NORMAL IMAGE)

BRIGHTNESS LEVEL
GREEN CHANNEL (NORMAL IMAGE)

BRIGHTNESS LEVEL
BLUE CHANNEL (NORMAL IMAGE)

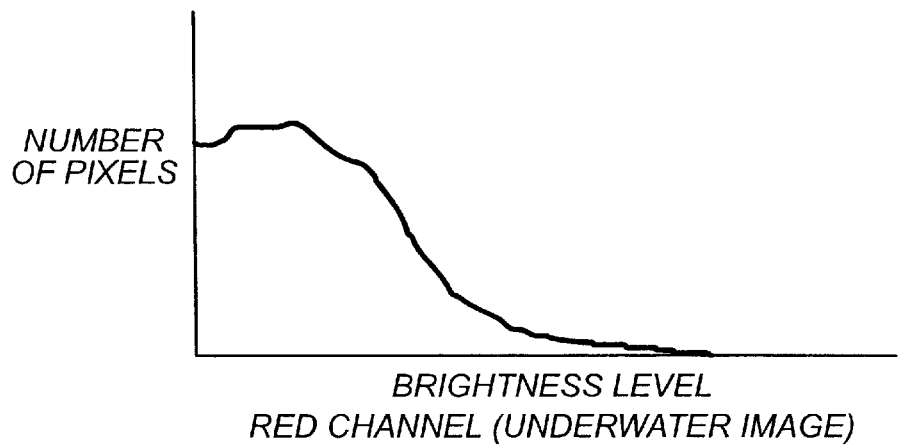
FIG. 4a BRIGHTNESS LEVEL RED CHANNEL (UNDERWATER IMAGE)
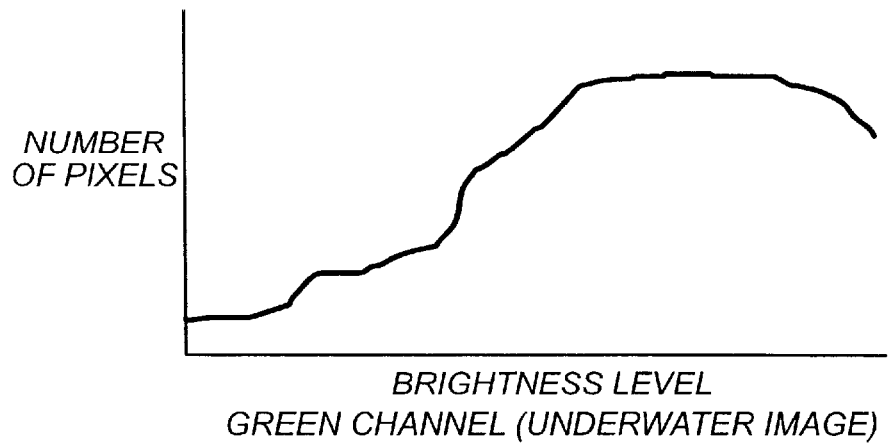
FIG. 4b BRIGHTNESS LEVEL GREEN CHANNEL (UNDERWATER IMAGE)
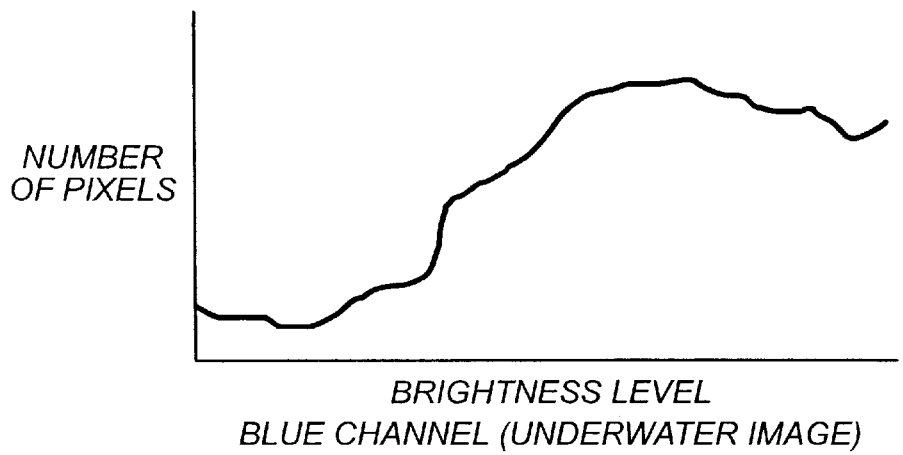
FIG. 4c BRIGHTNESS LEVEL BLUE CHANNEL (UNDERWATER IMAGE)

METHOD AND APPARATUS FOR PRINTING DIGITAL IMAGES

CROSS-REFERENCE TO RELATED APPLICATIONS

This is a divisional application of U.S. Ser. No. 09/248,967, filed Feb. 12, 1999, entitled METHOD AND APPARATUS FOR PRINTING DIGITAL IMAGES, by John R. Fredlund.

FIELD OF THE INVENTION

The present invention relates to digital printing, and more particularly, printing of images, which were captured underwater.

BACKGROUND OF THE INVENTION

Color prints obtained from images captured underwater are typically very disappointing to the consumer. When an image is captured underwater, red light is filtered out by the water. This filtering effect becomes even worse at greater depths and longer distance from the subject to the camera. This filtering results in prints made from these images to lack the appropriate amount of red. Available light photography becomes more difficult with depth as red light is filtered and the overall illumination becomes lower. This problem persists even when underwater illumination systems are provided because the red light is filtered by the amount of water between the light source and the subject, and then again as the reflected light returns to the camera. As a result, under exposures often suffer from poor image quality when reproduced by traditional systems.

The present approach to solving the problem of an image captured underwater includes over-exposing of the image. However, this only helps if the blue and green channels are not driven to clipping where the blue and green channels lose detail from saturation, and if compensation is made in the printing of the color negative. Placing a filter, such as a blue and green filter, over the camera's lens and metering system can help, but this decreases the overall light level and maintains a fixed ratio between the color channels. There has also been suggested the use of reversal film with an altered color balance. However, this is often costly in development and the fixed amplification ratio in the three color channels does not account for variations in depth and is subject to camera distance. While flash systems and other artificial lighting can be utilized, the distance between the subject and camera must be accounted for. While macro exposures are often used to minimize this distance problem, close-up photography may not be practical or desirable.

Thus, there exists a need to improve the quality of prints made from images captured underwater in an efficient and accurate manner.

SUMMARY OF THE INVENTION

In accordance with one aspect of the present invention there is provided a method for printing a customer image order containing at least one image captured underwater, comprising the steps:

a) obtaining a digital record of a customer image order containing at least one image and automatically determining if the at least one image was captured underwater;

b) manipulating the digital record of the at least one image captured underwater in a predetermined manner; and c) digitally printing the image captured underwater in accordance with the corrections.

In accordance with another aspect of the present invention there is provided a method of printing a customer image order containing at least one image captured underwater, comprising the steps of:

a) scanning a photosensitive media containing a customer image order having a plurality of images so as to obtain a digital record;

b) automatically determining if an image contained in the digital record has been captured underwater; and c) modifying the portion of the digital record containing the at least one image captured underwater so as to provide a modified image.

In accordance with yet another aspect of the present invention there is provided an apparatus for printing customer image orders containing at least one image captured underwater, comprising:

means for obtaining digital record of a customer image order having at least one digital image, means for determining the at least one image has been captured underwater; and means for automatically modifying the at least one image, if it was captured underwater, to a predetermined parameter.

In still another aspect of the present invention there is provided a computer program product, comprising a computer readable storage medium having a computer program thereon which when loaded into a computer, which causes the computer to performance the following steps:

a) obtaining a digital record of a customer image order containing at least one image;

b) automatically determining if the at least one image was captured underwater;

c) manipulating the digital record of the at least one image captured underwater in a predetermined manner; and d) digitally printing, storing, or displaying the image captured underwater in accordance with the manipulation to said digital record.

The above, and other objects, advantages and novel features of the present invention will become more apparent from the accompanying detailed description thereof when considered in conjunction with the following drawings.

BRIEF DESCRIPTION OF THE DRAWINGS

Embodiments of the invention will now be described with reference to the drawings in which:

FIGS. 4a, 4b and 4c are histograms of an image taken underwater for each of the three color channels.

DETAILED DESCRIPTION OF THE INVENTION

The present description will be directed, in particular, to elements forming part of, or in cooperation more directly with, the apparatus in accordance with the present invention, it being understood that elements not specifically shown or described may take various forms well known to those skilled in the art.

Figure 1:
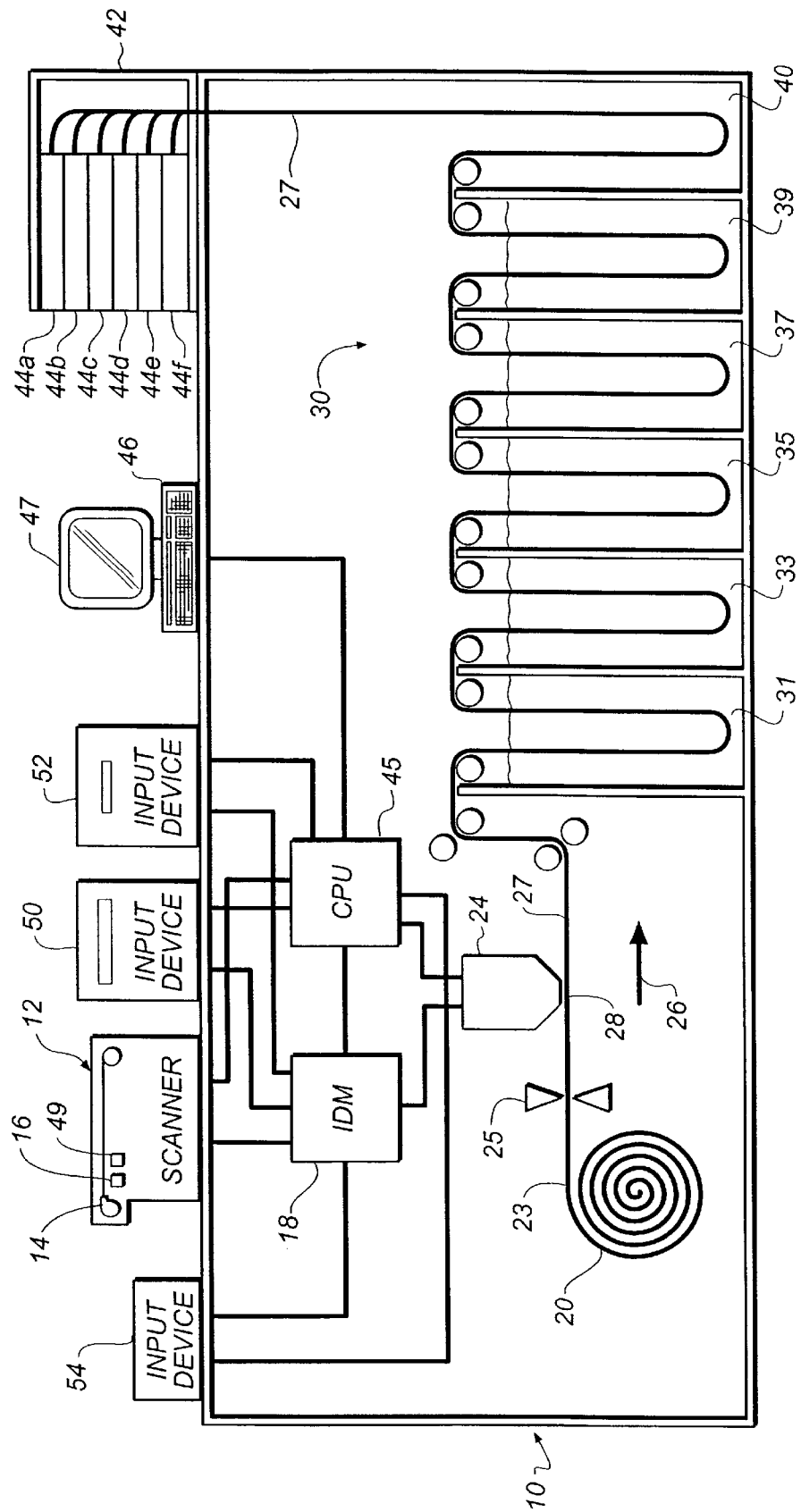
FIG. 1 is a schematic view of printing apparatus made in accordance with the present invention.

Referring to FIG. 1, there is illustrated an apparatus 10 made in accordance with the present invention. In particular, the apparatus 10 is an apparatus designed to print digital images onto a photosensitive media (material). In particular, the apparatus 10 is of the type commonly referred to as a photographic minilab. As is typical with most minilabs, customer image orders are provided for printing of images onto a photosensitive media. A customer image order, for the purposes of the present invention, is a single roll of developed photographic film or digital record file of a single printing order containing a plurality of images thereon. In the particular embodiment illustrated, the apparatus 10 includes a scanner 12, which is designed to receive and scan a roll of developed film 14. The roll of developed film 14 is transported past sensor 16 in scanner 12, which scans the images on the film 14 so as to provide a digital record of the customer images. The scanner 12 scans at a resolution sufficient to provide the desired quality prints. The scanner should scan at a resolution of at least 500×700 pixels per inch, generally at least 1000×1500 pixels per inch. Preferably, the scanner 12 scans at a high resolution equal to or greater than about 2000×3000 pixels per inch. The digital record of the image is forwarded to an image data manager (IDM) 18 wherein the images are manipulated as preprogrammed. In the embodiment illustrated, IDM 18 comprises a computer (microprocessor) used for manipulation of the digital images contained in the digital record file. The IDM 18 includes a memory for storing of the digital record of the customer image order.

The apparatus 10 further includes a supply roll 20 containing a web of photosensitive media 23, which in the present invention comprises photographic paper. A cutting mechanism 25 is provided for cutting the web of photosensitive media into individual cut sheets. The mechanism 25 may cut the web into sheets having any desired lengths. Appropriate transport mechanisms, not shown, are provided for advancing of the cut sheets in the direction indicated by arrow 26 along processing path 27 through apparatus 10, In particular, the cut sheets are transported from cutting mechanism 25 to an exposure gate 28 whereby a digital printer 24 exposes the individual images of the customer image order onto individual cut sheets, respectively, as the pass exposure gate 28. In the particular embodiment illustrated, the digital printer 24 is a MLVA (Micro Light Valve Array) printer which scans a light containing image data onto cut sheets as they moves in the direction indicated by arrow 26 past exposure gate 28. Since printer 24 is a digital printer and the cutting mechanism 25 may cut the web of photosensitive media 23 into any desired length cut sheets, the images produced on cut sheets may be provided in a variety of different format sizes being constrained only by the printing capabilities of the printer 24 and width of the web of the photosensitive media 23. It is also to be understood that the printer 24 may be any appropriate digital printer, for example, a CRT printer, LED printer, LCD printer, laser printer or other type of digital printer that can print onto a photosensitive media. Additionally, digital printer 24 may use non-photosensitive media such as an ink jet or thermal dye sublimation printer may also be use.

In the embodiment illustrated, the web of photosensitive media 23 comprises photographic paper, however, the media may comprise of other media capable of being printed on by a digital printer. While the apparatus 10 is shown the web of photosensitive media is first cut into individual cut sheets prior to printing, the present invention is not so limited. The digital images may be first printed on the web of photosensitive media 23 which at some later time, before or after processing, is cut into individual cut sheets forming individual prints, each print being representative of a print of a single customer image.

As is typical with minilabs, the apparatus 10 is further provided with a processing section 30 wherein the cut sheets, after leaving exposure gate 28, are passed therethrough for development as is customarily done in such devices. In the particular embodiment illustrated, the cut sheets are passed through a developer station 31 containing a developer solution, a bleach/fix station 33 containing a bleach/fix solution, a plurality of wash stations 35, 37 and 39 each containing a washing solution, and through a dryer section 40 for drying of the photosensitive media. The individual prints of the images are then forwarded to sorter 42 wherein the prints for each customer image order are collated into separate bins 44*a–f*, each bin preferably receiving an individual customer image order. It is to be understood that any desired number of bins 44 may be provided as appropriate for the apparatus 10 and sorted in accordance with any desired sorting criteria.

As is customary, a CPU (computer) 45, is provided for controlling operation of the apparatus 10 and its various components. A user/operator interface 46, which includes a viewing screen 47, is also provided, for allowing an operator to enter instructions for operation of the apparatus 10 and monitor operation of the apparatus as is customarily done.

An appropriate computer printing program is provided for controlling operation of the IDM 18. The computer program is provided in an appropriate format which allows loading of the program into the apparatus, which causes the computer to perform the required steps. In particular, the computer program is designed so that the IDM 18 will first obtain and store a complete customer image order prior to printing. In addition, appropriate algorithms are provided for analyzing, manipulating and correcting, of the digital images prior to printing.

Figure 2:
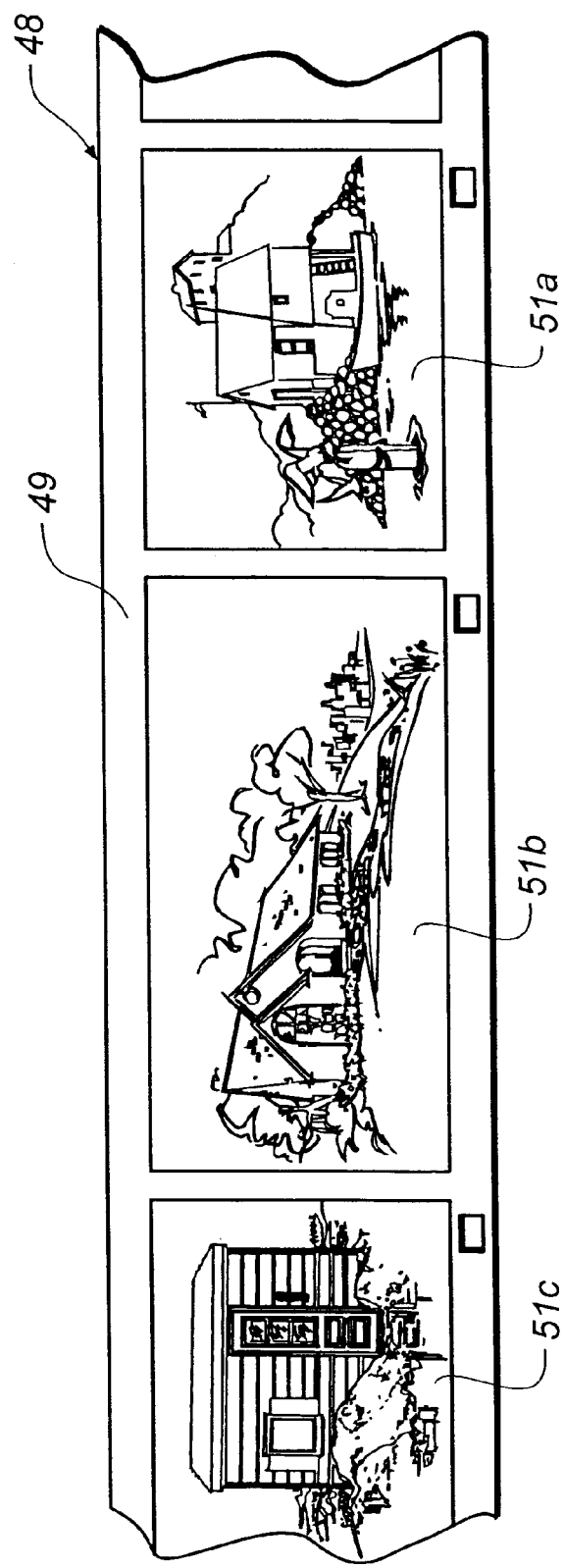
FIG. 2 is a top plan view of a portion of a filmstrip which may be used with the apparatus of FIG. 1.

Referring to FIG. 2, there is illustrated a portion of a strip 48 of developed photographic film which may be used in the apparatus 10 of the present invention. In the particular embodiment illustrated, the filmstrip 48 has a plurality of images 51 formed thereon and includes a magnetic layer 49 upon which instructional codes or information may be provided. It is of course understood that information and/or instructional codes may be provided on the filmstrip in any desired manner. In the particular embodiment illustrated, instructional codes placed thereon may indicate that the entire roll or a specific image on the roll has been captured underwater conditions. If it is known by the manufacturer or packager of the film, that the film may be used for capturing images underwater, an instructional code may be placed on the film indicating such. Otherwise, the camera, or other device such as an order bag, may be used to provide information that any one image or that all of the images on the roll of film was captured underwater. The scanner 12 having read this information, passes the information on to the IDM 18 whereas an appropriate algorithm can be automatically employed so as to be compensate for the fact that the image has been captured underwater. Preferably, the images are corrected such that when printed and/or otherwise visually displayed the image will have a color balance generally the same or more similar to an image take under normal conditions (not underwater). In particular, the appropriate amount of red color channel can be improved to a degree which will give an appearance that the image was taken under normal capture conditions.

Typically, underwater images are deficient in the red channel. A manipulation which can correct this can be as simple as the change in color balance which an operator might key into a traditional photofinishing system. However, it is the subject of this invention to describe the following method which improves upon this existing system.

In addition to providing amplification of the red channel, underwater images may be improved by expanding the contrast of the image once the desired color balance has been achieved. This is to say that the brightest areas in the image are reproduced as white, and the darkest areas are reproduced as black. The values in-between are "stretched" to provide a smooth transition from black to white. This contrast expansion provides the image with a more pleasing high-contrast appearance.

The third correction which may be applied is that of noise suppression. Particularly, because the red channel is amplified to more closely match the blue and green channels, it is likely that there will be noticeable noise in the red record. It is possible to average out some of this high frequency noise such that a more desirable image is produced.

It is to be understood that the information that the images were captured underwater may be provided in any other desired manner for example but not by way of limitation, the information may be noted on the order envelope which in turn can be read by the operator and programmed into the apparatus. Additionally the information made be obtained from a memory storage device, such as a card, used by a digital camera. This information can be also be obtained from a one-time use camera. That is, a one-time use camera designed for use underwater wherein a preprogrammed code is provided on the camera, film cartridge or directly on the film within the camera. This information or code can be manually entered into the apparatus 10 or read from the packaging, camera, film or cartridge.

It is also possible to determine when an image has been taken underwater by analyzing the scanned image. Thus, the apparatus 10 may be programmed to automatically identify when an image has been captured in underwater conditions and automatically adjusts to compensate for such capture. Varying amounts of correction may be applied due to degree of difference from the daylight image capture "norm." An image with minor difference is corrected less than one which differs greatly. Also, some images may be deemed unsalvageable and may not be corrected, or corrected in a different fashion (e.g. contrast expansion and noise suppressed but not color balanced).

Figure 3A:
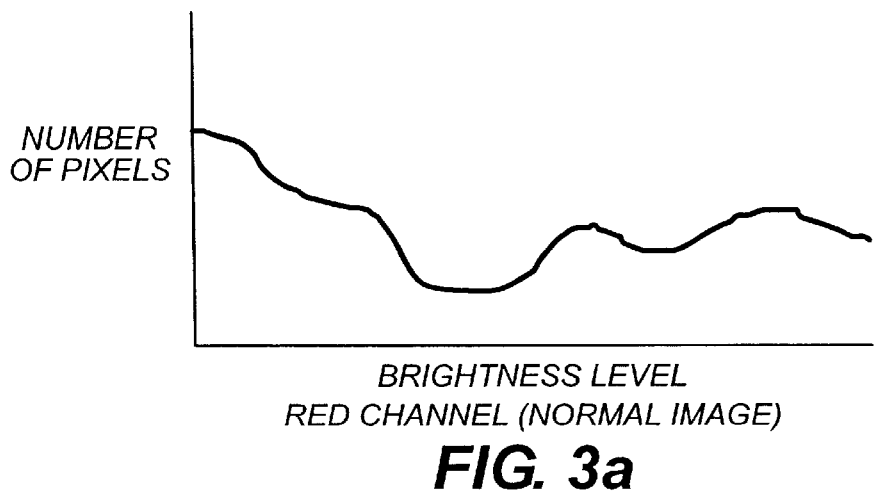
FIGS. 3a, 3b and 3c are histograms of an image taken under normal conditions for each of the three color channels.
Figure 3B:
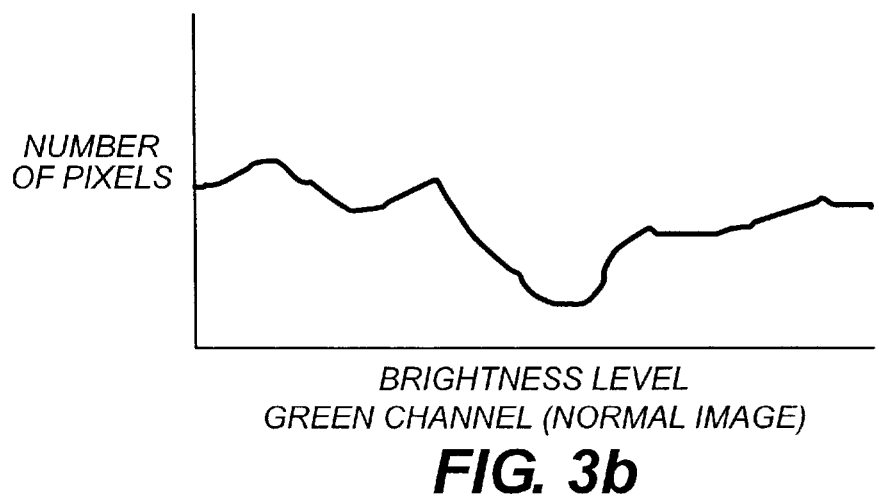
Figure 3C:
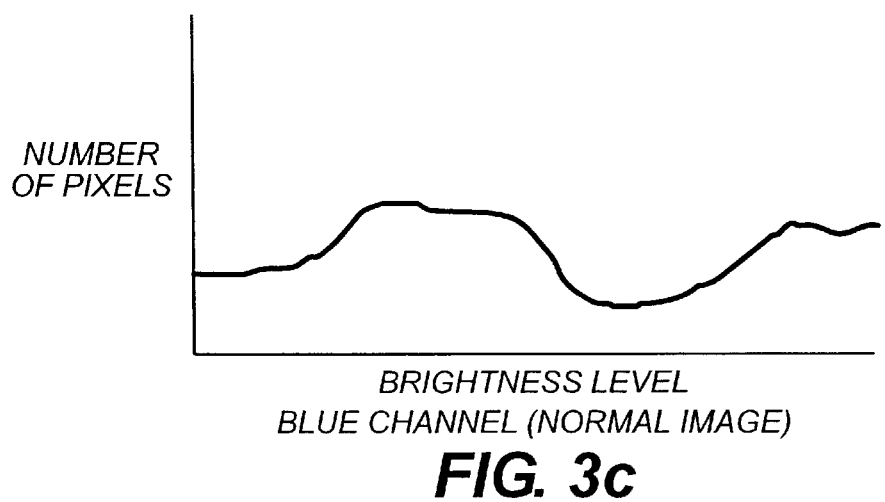

Referring to FIGS. 3a, 3b, 3c, there is illustrated three histograms of the red, blue and green channels of a typical image taken under normal lighting conditions. A histogram is a graphic representation of the final distribution (the brightness and darkness levels) in an image which plots the number of pixels at each brightness level. As can be seen from FIGS. 3a, 3b, 3c, an image captured under normal condition produce histograms for each of the color channels which look quite similar. Although they are never the same for any color image, the three channels have enough of a similar distribution to appear "balanced." A histogram for the three color channel underwater image capture will not show this balance.

Referring to FIGS. 4a, 4b, and 4c there are illustrated histograms of each of the three color channels of an image capture underwater. Due to the attenuating effects of water on red light, the captured image will characteristically have much higher levels of blue and green than red. This is shown by FIG. 4a by skewing red values to the darker brightness levels. The low level of red light relative to that of green and blue is characteristic of images captured underwater. An algorithm for detecting underwater exposures in need of color correction analyzes images for this characteristic, that is a lack of balance between red vs. blue and green channels. If this signature is not found, the underwater correction is not applied and if the underwater characteristic is found then the correction algorithm is applied. By this means even groups of images that have images exposed underwater and above water can both be printed correctly. After an image has been scanned by scanner 12, appropriate histograms of each image may be obtained and compared with the curves of FIGS. 4a, 4b and 4c. When the curves of the histogram obtained for the scanned image fall within predetermined parameters in relation to the histograms of FIGS. 4a, 4b and 4c, this will advise the IDM 18 that the image was captured underwater at which time an appropriate correction algorithm is used for modifying the appropriate color channels to compensate for such capture.

In order to better understand the present invention, a description of its use will be discussed. A customer image order is received by the retail establishment, the customer image order typically comprising a roll of undeveloped film. The film is then developed and forwarded to a printing apparatus, such as apparatus 10 previously described, for printing. The photographic film is scanned by scanner 12 whereby the images are digitized and forwarded onto IDM 18. In addition, scanner 12 reads any instructional code or information identifying that an image, or that the entire roll of images was captured underwater. If such images exist, an appropriate correction algorithm is activated for such images so prior to forwarding onto the digital printer. Alternatively, if no code is read an appropriate detection algorithm is provided in the IDM for analyzing the digital record to determine if any of the images were taken underwater. As previously discussed, this can be accomplished by developing histograms (or data representing the histogram) for each of the images and comparing the developed histogram with stored histograms of underwater images for detecting if the images were captured underwater. An appropriate correction algorithm is activated and applied to the underwater images if it is determined that images were taken underwater. Once the underwater captured images have been digitally corrected, the images are then forwarded onto the digital printer for printing along with the rest of the customer image order.

In the embodiments discussed above, the images for printing are obtained by scanning a developed roll of photosensitive film. However, the present invention is not so limited. As illustrated in FIG. 1, image data and customer image order may be obtained from a variety of different sources whereby a customer image order may be submitted for printing, including providing of information of where the printed images are to be forwarded. For example, image input devices 50, 52, 54 may be provided wherein input device 50 may provide the images supplied on a CD, device 52 can be used to obtain images provided on computer disk, or memory card, and a communication modem 54 may be provided to receive images over the internet, or from any other source that can forward digital images.

In the embodiment illustrated, the apparatus 10 does the printing, however, the present invention is not so limited. For example, the printing can be forwarded onto a different device for storage, printing and/or display. For example, the IDM 18 may forward the image through modem 54 to a customer or other device for providing and/or storing images.

In the embodiment illustrated in FIG. 1, the individual components are illustrated as a single apparatus 10.

Figure 5:
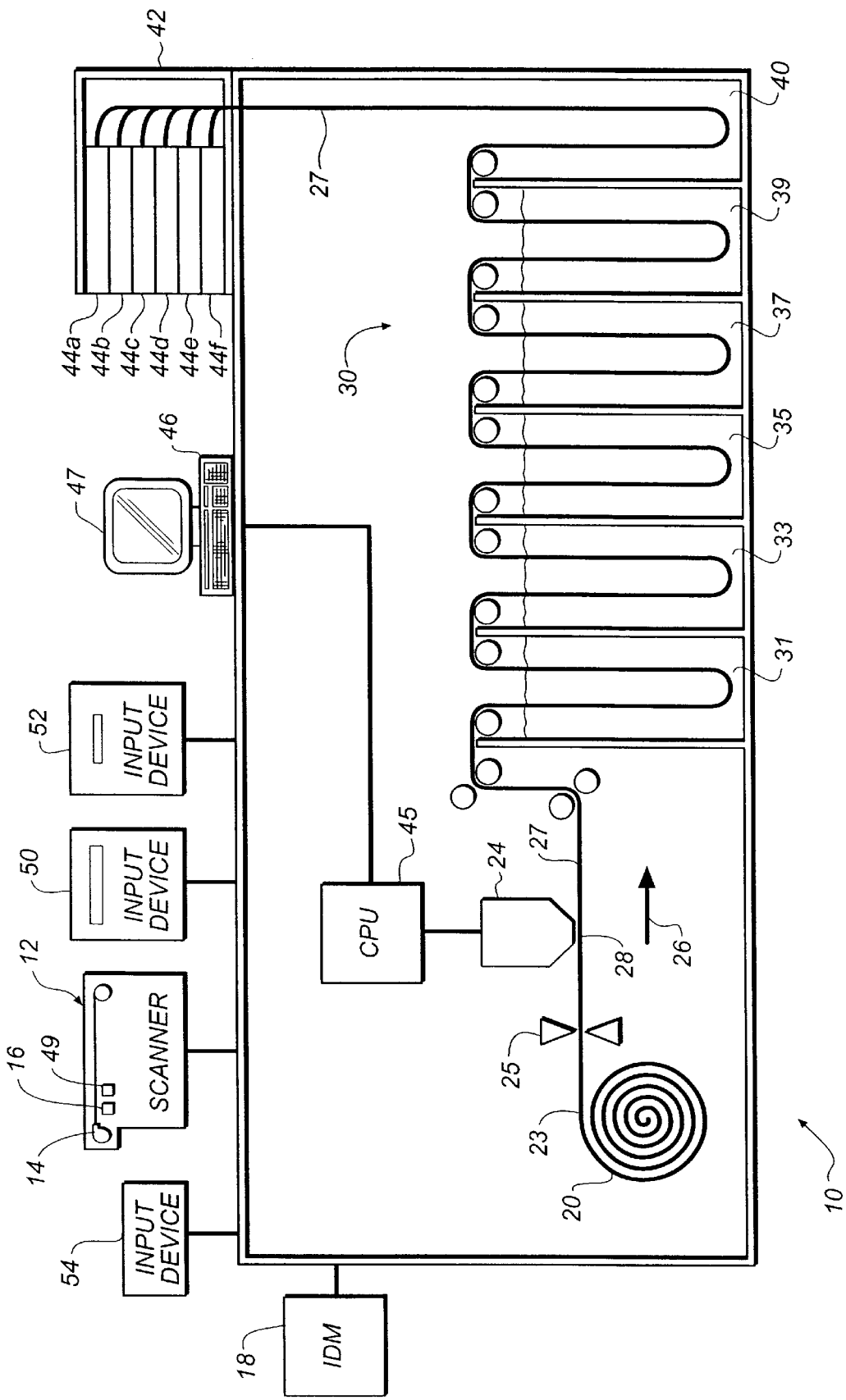
FIG. 5 is a schematic view of a modified system in accordance with the present invention.

However, the present invention is not so limited. Referring to FIG. 5, there is illustrated a modified form of the present invention, like numerals indicating like parts and operation as previously discussed. In this embodiment, the scanner 12, IDM 18 and devices 50, 52, 54 are shown as separate individual components from the apparatus 10, which is used for printing of the images onto a photosensitive media. The operation and function of all the elements are the same except that individual elements are discrete elements that can be separate from each other and connected by appropriate communication lines as is well known to those of ordinary skill in the art.

In the embodiment illustrated, the processing of the photosensitive media is done by the apparatus 10. However, the present invention is not so limited. For example, the images may be printed on the web of photosensitive material 23 and forwarded in web form to a processor wherein the images are developed after which the developed web is forwarded onto a finishing station wherein the web is cut into individual prints and sorted by customer image order.

It is to be understood that various other changes and modifications may be made without departing from the scope of the present invention. The present invention being defined by the following claims.

PARTS LIST

10 Apparatus
12 Scanner
14 Developed film
16 Sensor
18 Image data manager (IDM)
20 Supply roll
23 Photosensitive media
24 Digital printer
25 Cutting mechanism
27 Processing path
26 Arrow
28 Exposure gate
30 Processing section
31 Developer station
33 Bleach/fix station
35 Wash station
37 Wash station
39 Wash station
40 Dryer section
42 Sorter
44a–f Bins
45 CPU (computer)
46 User/operator interface
47 Viewing screen
48 Filmstrip
49 Magnetic layer
50 Input device
51a–c Images
52 Input device
54 Input device

What is claimed is:

1. An apparatus for printing customer image orders containing at least one image captured underwater, comprising:

means for obtaining digital record of a customer image order having at least one digital image;

means for analyzing a digital color record of said at least one image for determining if any one of said at least one image has been captured underwater; and means for automatically modifying said any one of said at least one images captured underwater to a predetermined parameter.

2. An apparatus according to claim 1 wherein said predetermined parameter comprises modifying the digital record of one of said at least one image captured underwater so that the digital image when printed or displayed will have a generally normal color appearance similar to that of an image captured under normal conditions.

3. An apparatus according to claim 1 wherein said predetermined parameter comprises modifying the digital record of one of said at least one image captured underwater so that the digital image when printed or displayed will have a generally normal contrast appearance similar to that of an image captured under normal conditions.

4. An apparatus according to claim 1 wherein said means for determining if any one of said at least one image has been captured underwater comprises means for analyzing the digital color image.

5. An apparatus according to claim 4 wherein said means mean for analyzing the digital color images comprises an algorithm which produces histograms of said images and compares them with stored information representative of histograms of images taken underwater.

6. An apparatus according to claim 1 wherein said means for determining if any one of said at least one image has been captured underwater comprises means for reading a code provided in said customer image order.

* * * * *